United States Patent
Tompkins

(10) Patent No.: US 10,313,248 B2
(45) Date of Patent: *Jun. 4, 2019

(54) DATA FLOW NODE VALIDATION

(71) Applicant: Adobe Inc., San Jose, CA (US)

(72) Inventor: David M. Tompkins, Menlo Park, CA (US)

(73) Assignee: Adobe Inc., San Jose, CA (US)

(*) Notice: Subject to any disclaimer, the term of this patent is extended or adjusted under 35 U.S.C. 154(b) by 236 days.

This patent is subject to a terminal disclaimer.

(21) Appl. No.: 14/308,492

(22) Filed: Jun. 18, 2014

(65) Prior Publication Data

US 2015/0372877 A1 Dec. 24, 2015

(51) Int. Cl.
| | |
|---|---|
| *G06F 15/173* | (2006.01) |
| *H04L 12/813* | (2013.01) |
| *G06F 3/0484* | (2013.01) |
| *H04L 12/24* | (2006.01) |

(52) U.S. Cl.
CPC .......... *H04L 47/20* (2013.01); *G06F 3/04842* (2013.01); *H04L 41/16* (2013.01); *H04L 41/5009* (2013.01); *H04L 41/5025* (2013.01); *H04L 41/5051* (2013.01)

(58) Field of Classification Search
CPC . H04L 47/20; H04L 41/5051; H04L 41/5025; H04L 41/5009; H04L 41/16; G06F 3/04842
See application file for complete search history.

(56) References Cited

U.S. PATENT DOCUMENTS

| | | | |
|---|---|---|---|
| 9,092,502 B1* | 7/2015 | Cannaliato | G06F 17/30595 |
| 9,548,941 B2 | 1/2017 | Tompkins | |
| 2007/0260782 A1 | 11/2007 | Shaikli | |
| 2008/0005392 A1* | 1/2008 | Amini | H04L 29/06027 710/29 |
| 2011/0093852 A1 | 4/2011 | Li et al. | |
| 2011/0231576 A1* | 9/2011 | Blaszczak | G06F 12/023 709/246 |
| 2013/0217343 A1 | 8/2013 | Tenbroek et al. | |

(Continued)

OTHER PUBLICATIONS

"Pre-Interview Communication", U.S. Appl. No. 14/308,538, filed Apr. 29, 2016, 3 pages.

(Continued)

*Primary Examiner* — Padma Mundur
(74) *Attorney, Agent, or Firm* — SBMC

(57) ABSTRACT

Data flow node validation and provisioning techniques are described. In one or more implementations, a system is described that supports visual design and deployment of data flow pipelines to process streaming data flows. The system may be configured to include nodes and connections between the nodes to represent an arbitrary execution graph of data science algorithms (as algorithm action components) that are used to process the streaming data flows. The system may also support validation techniques to verify that the data flow pipeline may operate as intended. Further, the system may also support implementation and provisioning techniques that involve estimation and adjustment of runtime resource provisioning of a deployed data flow pipeline without preemption or starvation occurring for nodes within the pipeline.

19 Claims, 10 Drawing Sheets

(56) References Cited

U.S. PATENT DOCUMENTS

2015/0372940 A1    12/2015    Tompkins

OTHER PUBLICATIONS

"First Action Interview Office Action", U.S. Appl. No. 14/308,538, filed Jun. 16, 2016, 3 pages.
"Corrected Notice of Allowance", U.S. Appl. No. 14/308,538, filed Dec. 14, 2016, 5 pages.
"Notice of Allowance", U.S. Appl. No. 14/308,538, filed Sep. 8, 2016, 7 pages.

* cited by examiner

DATA FLOW NODE VALIDATION

BACKGROUND

Vast amounts of data are being made accessible to users that may be processed by data flow pipelines to model the data, discover useful information, may suggest correspondence between different factors represented in the data, and so on. These techniques are commonly referred to as data analytics, "big data," data mining, and so forth.

Conventional techniques to design and implement data flow pipelines, however, required specialized knowledge of highly-trained technicians. Further, these conventional techniques may involve a significant amount of time to perform even by a technician having this specialized knowledge, which may be due to the complexity both in designing a data flow pipeline that may be functional as well as provisioning the data flow pipeline for actual implementation. Thus, these conventional techniques could hinder user access to this functionality, both in the knowledge needed to design the data flow pipeline as well as the time required to do so.

SUMMARY

Data flow node validation and provisioning techniques are described. In one or more implementations, a system is described that supports visual design and deployment of data flow pipelines to process streaming data flows. The system may be configured to include nodes and connections between the nodes to represent an arbitrary execution graph of data science algorithms (as algorithm action components) that are used to process the streaming data flows. Additionally, the system may also support validation techniques to verify that the data flow pipeline may operate as intended. Further, the system may also support implementation and provisioning techniques that involve estimation and adjustment of runtime resource provisioning of a deployed data flow pipeline without preemption or starvation occurring for nodes within the pipeline.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
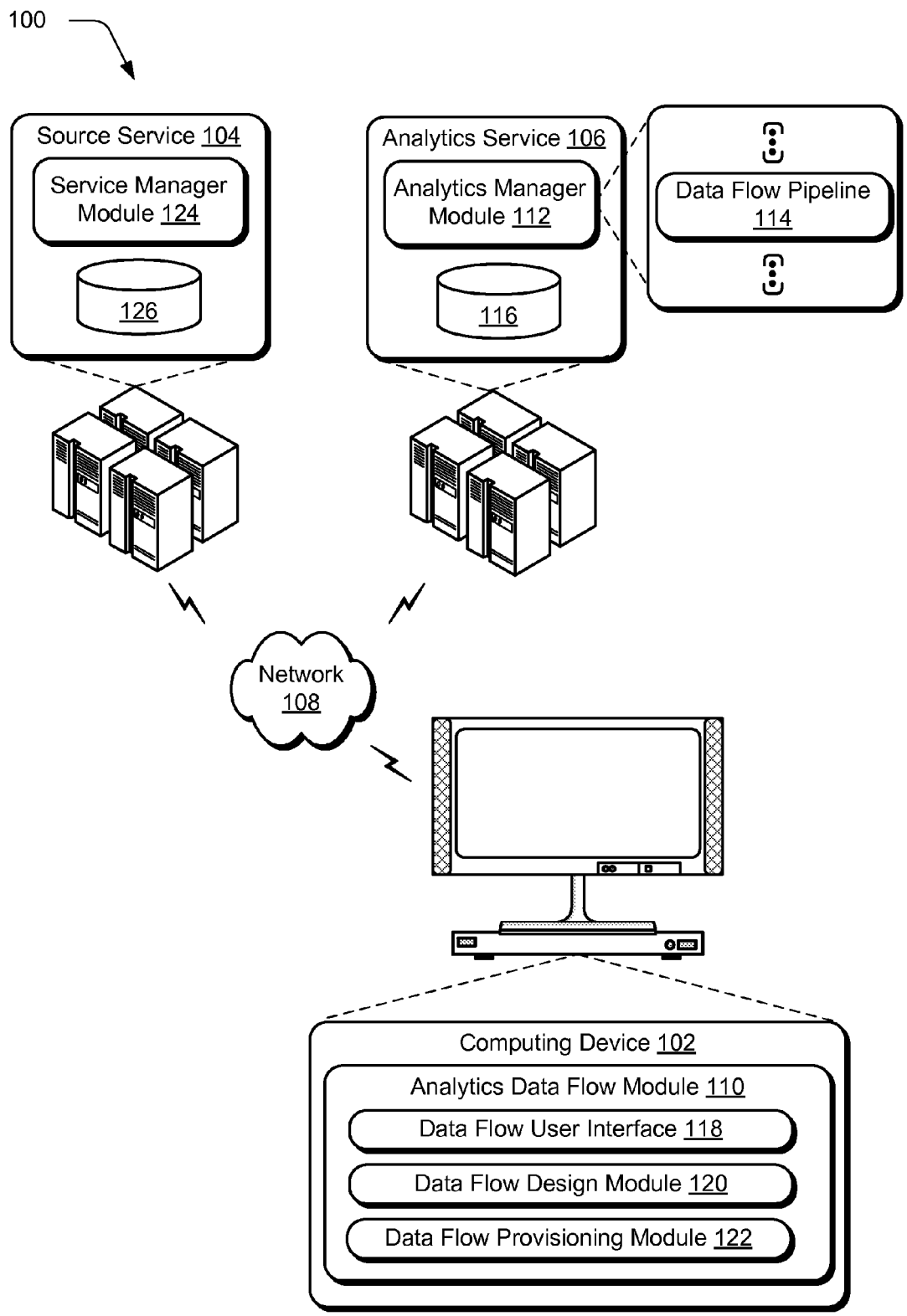
FIG. 1 is an illustration of an environment in an example implementation that is operable to employ the data flow pipeline techniques described herein.

Data flow pipelines may be configured to process streaming data flows. A data flow pipeline may be defined as an arbitrary execution graph of data science algorithms that are configured to operate on one or more streaming data inputs to produce one or more streaming data outputs. As previously described, data flow pipelines may be configured to process vast amounts of data, e.g., petabytes of data from social network input sources, sensors, data repositories, and so on. Conventional techniques to design and implement the data flow pipelines, however, may involve specialized knowledge applied over significant amounts of time to design and implement the data flow pipelines, especially when confronted with this vast amount of data. Further, these conventional techniques could result in inefficiencies in these designs, which could result in inefficient use of a vast amount of computational and network resources used to implement the pipeline.

Data flow pipeline validation and implementation techniques are described. In one or more implementations, a system is described that supports visual design and deployment of data flow pipelines to process streaming data flows. The system may be configured to include nodes and connections between the nodes to represent an arbitrary execution graph of data science algorithms (as algorithm action components) that are used to process the streaming data flows. In this way, a user may efficiently select, connect, and rearrange the nodes to form a data flow pipeline through interaction with a graphical user interface.

Additionally, the system may support validation techniques to verify that the data flow pipeline may operate as intended. For example, the system may include functionality to provide real-time management and validation by measuring current flow rates of streaming data input sources. The system may then make adjustments automatically and without user intervention to the data flow pipeline as it is being created (e.g., in real time), such as to adjust the pipeline by adding or removing nodes from the pipeline. The nodes, for instance, may represent algorithm actions to be performed by the node to perform data processing as well as an amount of computing resources allocated to perform the algorithm actions of the node. Further discussion of validation techniques may be found in relation to FIGS. 2-6.

Further, the system may also support implementation techniques that involve estimation and adjustment of runtime resource provisioning of a deployed data flow pipeline without preemption or starvation occurring for nodes within the pipeline. This capability may optimize the provisioning of the deployed pipeline for both performance and cost. For example, the data flow pipeline may be activated for a predetermined amount of time, sampled, and used to calculate flow rate efficiency to identify underflow or overflow conditions. Adjustments may then be made to the provisioning automatically and without user intervention. Further, these techniques may iterate until convergence within a threshold of an error function is reached. Further discussion of the implementation techniques may be found in relation to FIGS. 7-9.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the data flow pipeline techniques described herein. The illustrated environment 100 includes a computing device 102, a source service 104, and an analytics service 106, that are communicatively coupled, one to another, via a network 108. The computing device 102, as well as the computing devices that implement the source service 104 and the analytics service 106, may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as illustrated for the source service 104 and the analytics service 106, further discussion of which may be found in relation to FIG. 10.

The computing device 102 is illustrated as including an analytics data flow module 110 and the analytics service 106 is illustrated as including an analytics manager module 112. Both the analytics data flow module 110 and the analytics manager module 112 are representative of functionality to design and implement the data flow pipeline 114, which may be stored in storage 116 of the analytics service 106 and implemented as nodes via one or more of the computing devices of the analytics service 106 or elsewhere, e.g., may include the source service 104, an output destination, and so forth as further described below.

For example, the analytics data flow module 110 is illustrated as supporting a data flow user interface 118 and including a data flow design module 120 and a data flow provisioning module 122. The data flow user interface 118, as utilized as part of the data flow design module 120, is configured to support user inputs to arrange nodes and specify connections between the nodes to generate the data flow pipeline 114. For example, the data flow pipeline 114 may include nodes that represent input data sources, such as the source service 104 that includes a service manager module 124 and storage 126 that represents a source of data this is to be streamed via the network 108 to the analytics service 106 for processing by the data flow pipeline 114. The source service 104 as well as data sourced by the source service 104 may take a variety of different forms, such as data generated using sensors of a "smart grid," data from a social network service (e.g., Twitter® fire hose, Adobe® fire hose), data from network services such as e-commerce sites, webpages, data storage services, media content services, and so on.

As part of the design and provisioning of the data flow pipeline 114, functionality of which is represented respectively by the data flow design module 120 and the data flow provisioning module 122, real time validation and sampling may be employed automatically and without user intervention to validate and provision the data flow pipeline 114. During the design phase of the data flow pipeline, for instance, the data flow design module 120 may perform a variety of different functions in response to interactive design actions. These may include measurement of current flow rates of data from the source service 104 in real time (i.e., the streaming data input source), such as in records per second, Kbytes per second, and so forth.

The data flow design module 120 may also measure acceptable output flow ranges of the streaming data flow outputs of nodes of the data flow pipeline 114, which may be based on an online estimation of the expected data results of the data flow pipeline. The estimation may be calculated in a variety of ways, such as by using characterization parameters of algorithm action components along with live samples of the input data sources, which may be used to determine whether the estimation calculation meets latency constraints. The data flow design module 120 may also be configured to validate that the data flow pipeline 114 will not produce runaway acyclic feedback within the pipeline using the information gathered by the functionality described above.

In this way, the data flow design module 120 may utilize validation functionality to ensure that visually designed data flows will operate correctly within a deployment environment. Further, the data flow design module 120 may ensure that there will not be resource contention between deployed data flow pipelines 114. Further discussion of the design and validation techniques may be found in relation to FIGS. 2-6.

The analytics data flow module 110 is also illustrated as including a data flow provisioning module 122. The data flow provisioning module 122 is representative of functionality to estimate and tune runtime resource provisioning of the data flow pipeline 114, when deployed. The tuning may be performed such that a deployment cluster (an example of which is illustrated as an analytics service 106) may be shared by a plurality of data flow pipelines 114 without preemption or starvation occurring for any data flow pipeline 114 within the set, as well as nodes within the pipelines. Further discussion of the implementation and provisioning of data flow pipelines 114 may be found in relation to FIGS. 7-9.

Data Flow Node Validation

Figure 4:
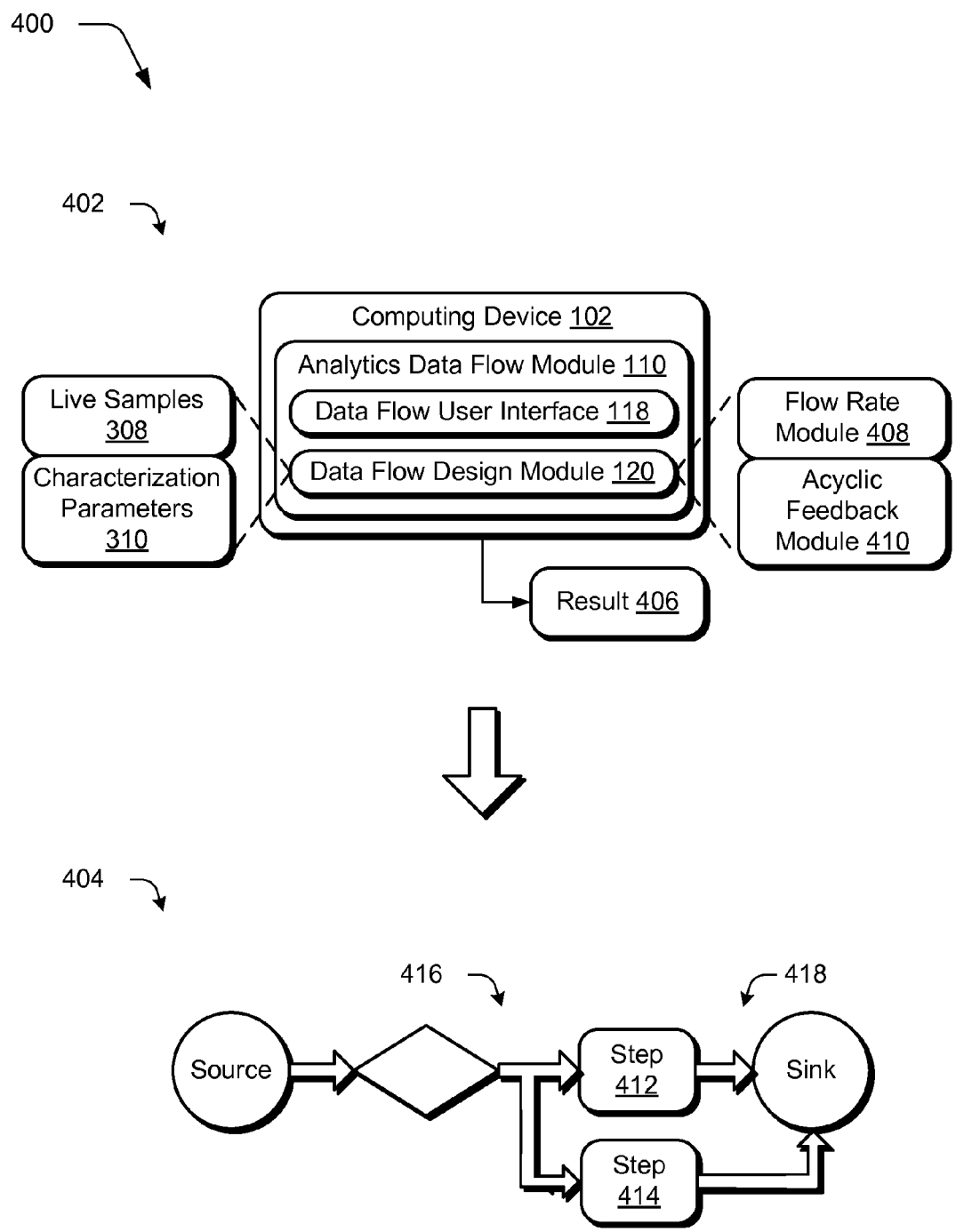
FIG. 4 depicts a system in an example implementation in which operation of nodes forming a data flow pipeline is validated using live samples and characterization parameters of FIG. 3.
Figure 5:
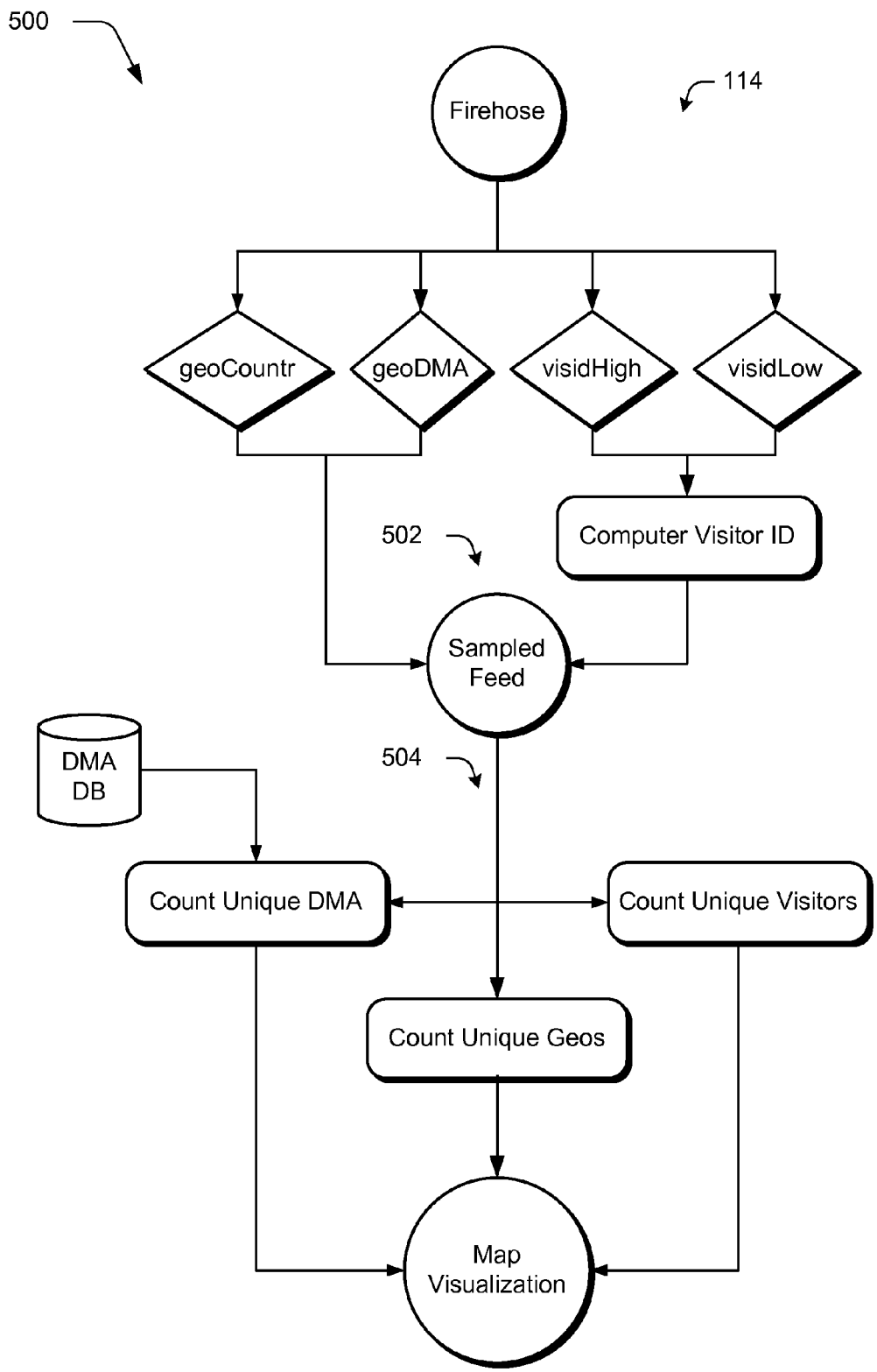
FIG. 5 is an implementation example of nodes of a data flow pipeline having joins and diversions.
Figure 6:
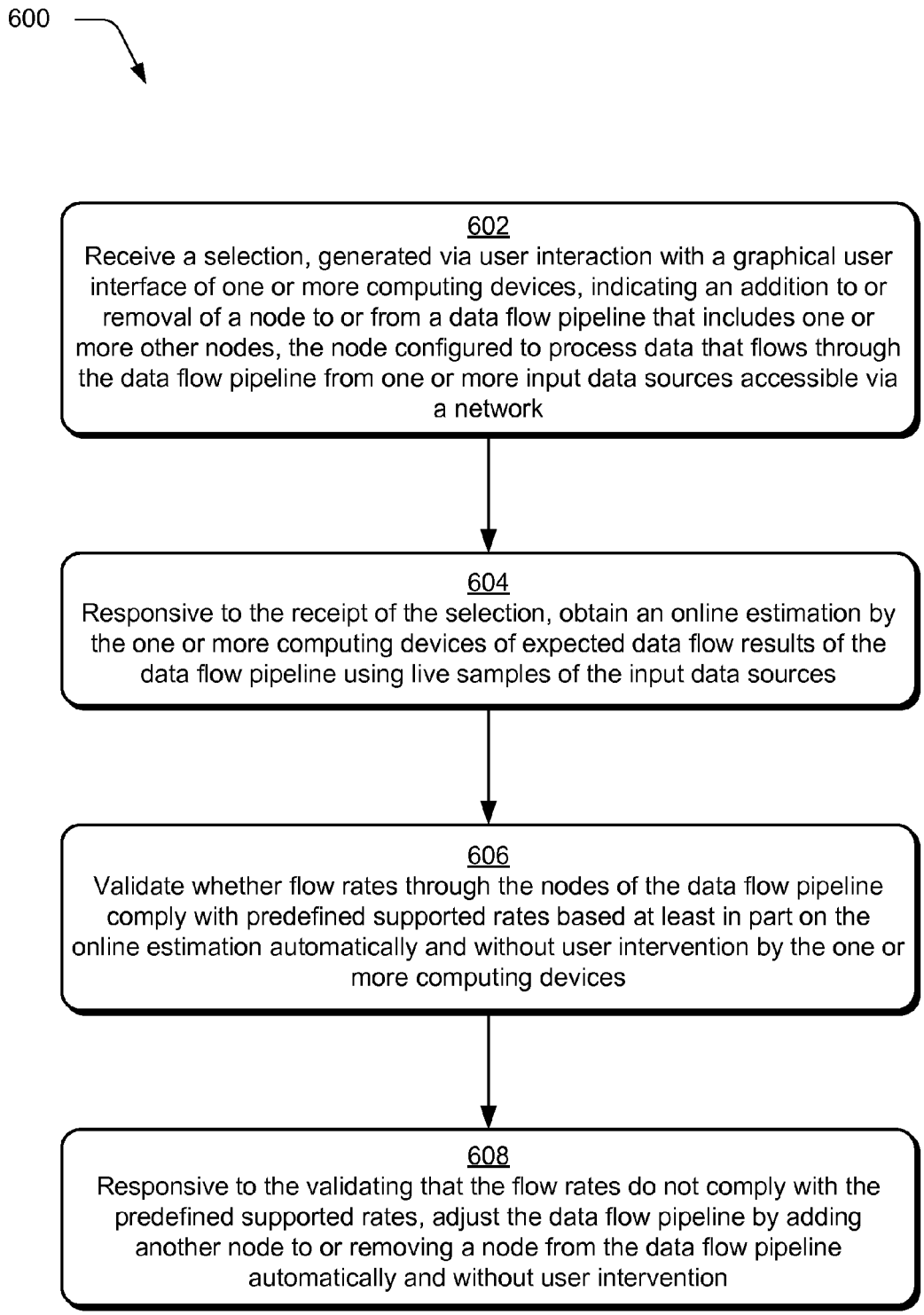
FIG. 6 is a flow diagram depicting a procedure in an example implementation in which a data flow design module is used to aid design of a data flow pipeline.

FIGS. 2-6 describe example systems 200, 300, 400, 500 and a procedure 600, respectively, in which a data flow design module 120 is used to aid design of a data flow pipeline. FIG. 6 is a flow diagram that describes steps in a procedure 600 in accordance with one or more embodiments. The procedure can be performed in connection with any suitable hardware, software, firmware, or combination thereof as further described in relation to FIG. 10. In at least some embodiments, the procedure is performed, at least in part, by suitably-configured modules, such as a data flow design module 120 which may be implemented locally at the computing device 102 and/or remotely by the analytics service 106 as part of the analytics manager module 112. As such, the following discussion refers to FIGS. 2-6 as well as FIG. 1. in the description of this example functionality.

Figure 2:
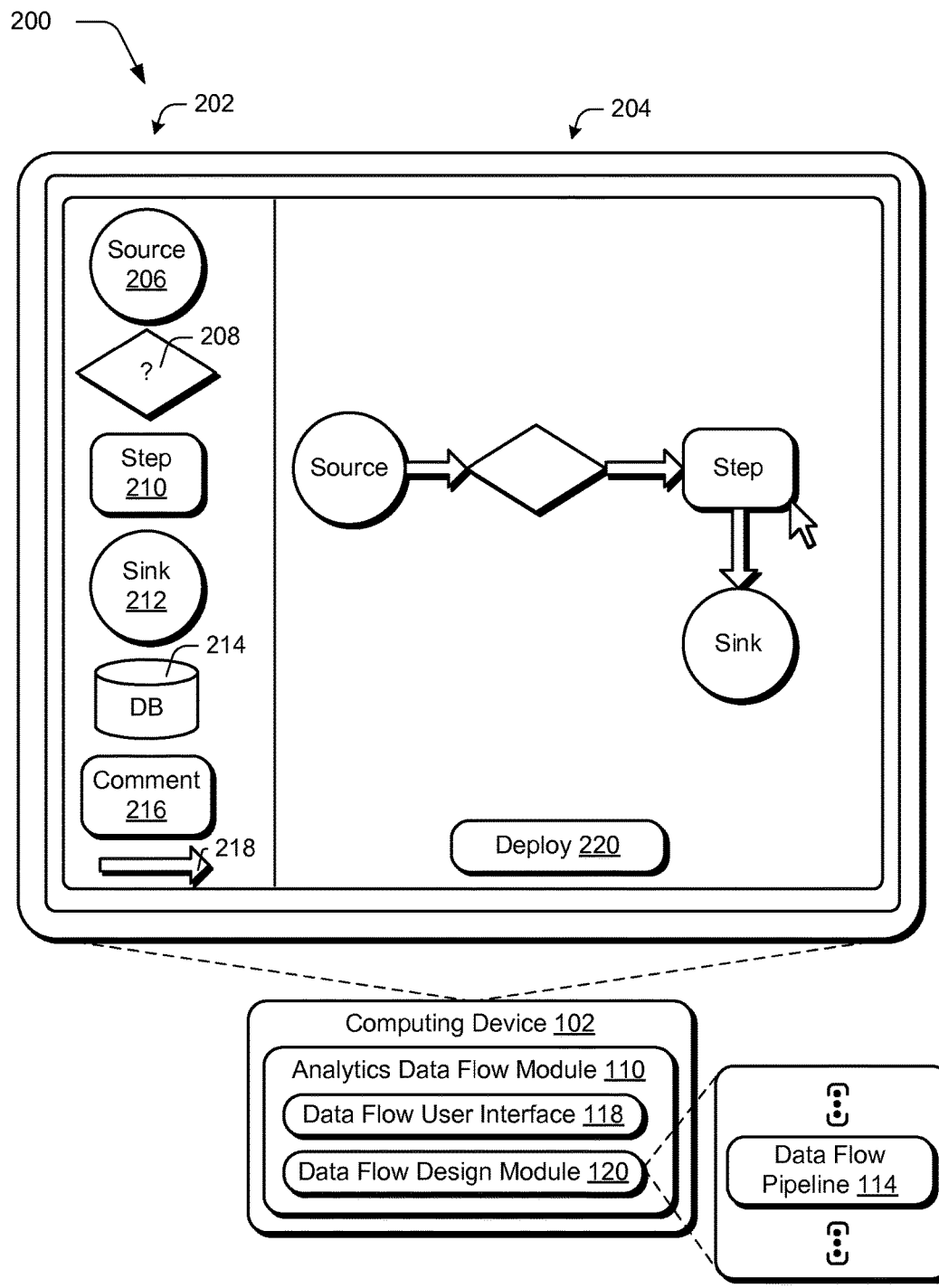
FIG. 2 depicts a system in an example implementation in which a data flow user interface is shown in greater detail as output in response to a data flow design module of FIG. 1.

FIG. 2 depicts a system 200 in an example implementation in which the data flow user interface 118 is shown in greater detail as output in response to the data flow design module 120. The data flow user interface 118 is configured to provide a visual metaphor for the design of data flow pipelines through use of representations of nodes. The nodes are representative of functionality configured to process, originate, or receive data that flows through the data flow pipeline 114 from one or more input data sources accessible via a network, e.g., the source service 104.

The data flow user interface 118 is illustrated as including a toolbar 202 and a design worksheet 204. The toolbar 202 includes nodes that may be selected for inclusion on the design worksheet 204, such as by using a cursor control device (e.g., a drag-and-drop operation), via a gesture, voice command, and so forth. A variety of different types of nodes representing a variety of different functionality for inclusion in a data flow pipeline 114 may be represented, such as data science functions as further described below. For example, a source 206 node may represent an input data source, such as from a source service 104. As previously described, the input data source may take a variety of different forms to data to be streamed to the data flow pipeline 114, such as data collected describing user navigation at a website, messaging performed, e-commerce, social network communications, real time sensor data, and so on. As such, the amount of data that may originate from these input data sources may be vast as previously described.

Filter 208 nodes are representative of processing functionality to filter the data to find desired values, such as geographical information describing a user (e.g., users of a website from a particular geographic locale), product, transaction, keyword, and so forth. The step 210 node is also representative of processing functionality, such as to compute desired values from the filtered or other data, e.g., a number of unique visitors.

Sink 212 nodes represent destinations for data flow processed by the data flow pipeline 114, which may employ visualizations (e.g., maps, graphs, and so forth) such that a user may view a result of the processing performed by the data flow pipeline, repository of "results," and so forth. A database 214 node is representative of another input data source that may be used for processing by the data flow pipeline 114, but in this instance may be representative of a source internal to a service. A comment 216 node, as the name implies, may be utilized by a designer to include comments in the data flow pipeline 114 but is not used to perform actual processing of data. A connector 218 is also illustrated which may be used to specify a connection and direction of data to flow between nodes of the data flow pipeline 114.

In this way, a user may specify nodes and connections between the nodes as a visual metaphor to efficiently design a data flow pipeline 114 without requiring specialized knowledge on the part of a user designing the data flow pipeline. Once designed, a user may select functionality to deploy 220 the data flow pipeline 114 (e.g., selecting a button in the data flow user interface 118) to cause the data flow pipeline 114 to be provisioned and implemented automatically and without user intervention as further described in relation to FIGS. 7-9.

As part of the design the data flow pipeline 114, the data flow design module 120 may be configured to validate that the data flow pipeline 114 will operate as intended. Part of this validation may be performed to ensure that underflow and overflow conditions are not introduced as the data flow pipeline 114 is constructed, further discussion of which is described in greater detail in the following.

Figure 3:
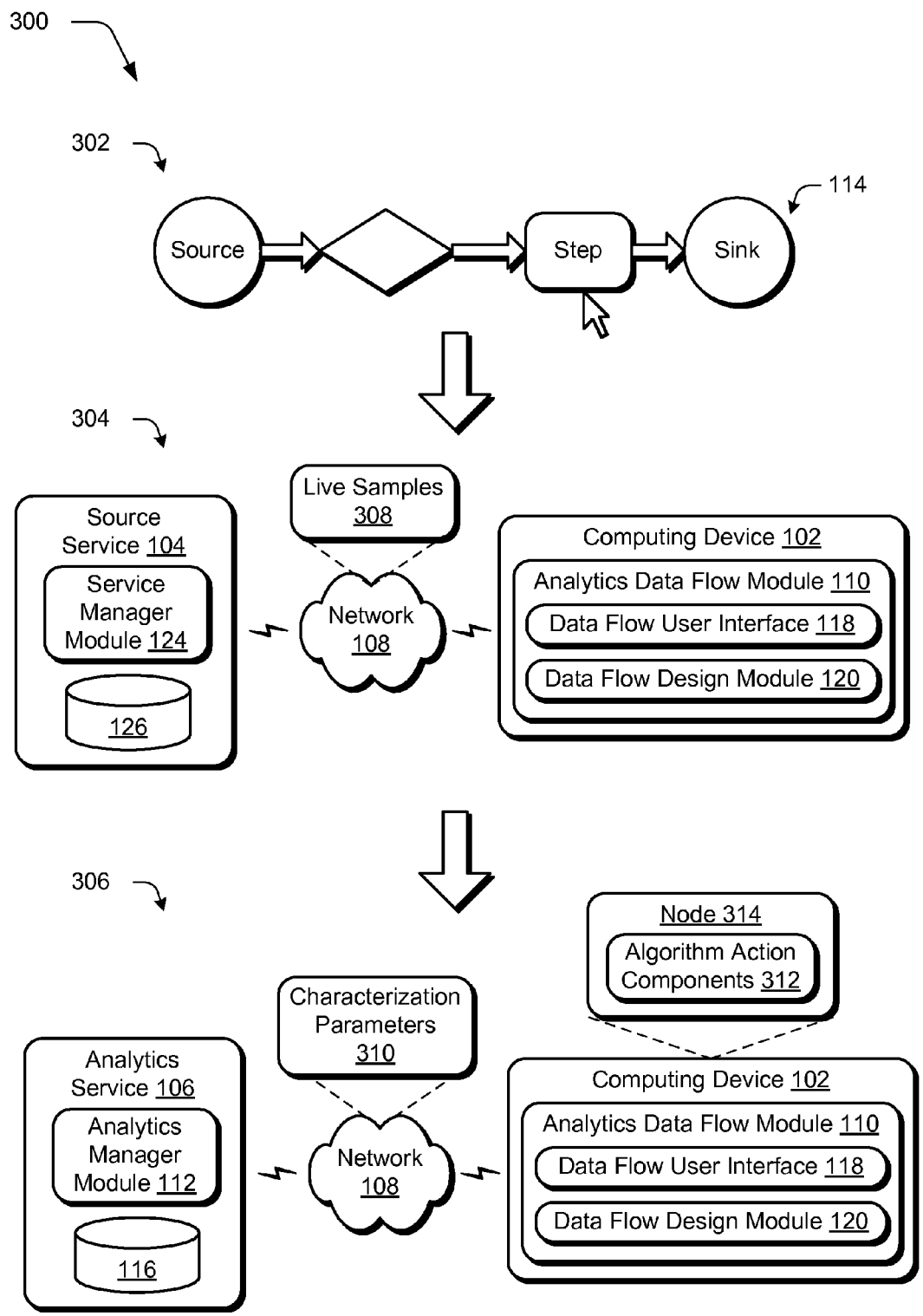
FIG. 3 depicts a system in an example implementation in which parameters are collected of a live source responsive to selection of nodes to form a data flow pipeline.

FIG. 3 depicts a system 300 in an example implementation in which parameters are collected of a live source responsive to selection of nodes to form a data flow pipeline 114. This system 300 is illustrated using first, second, and third stages 302, 304, 306. At the first stage 302, a selection is received, generated via user interaction with a graphical user interface of one or more computing devices, indicating an addition to or removal of a node to or from a data flow pipeline that includes one or more other nodes. The node is configured to process data that flows through the data flow pipeline from one or more input data sources accessible via a network (block 602 of FIG. 6). A user, for instance, may select a node from a toolbar 202 of FIG. 2 and drag it into a worksheet 204 area, after which one or more connectors 218 are used to connect it to other nodes of the data flow pipeline 114.

Response to the receipt of the selection, an online estimation is obtained by the one or more computing devices of expected data flow results of the data flow pipeline using live samples of the input data sources (block 604 of FIG. 6). This online estimation may be calculated in a variety of ways. As shown in the second stage 304, for instance, the data flow design module 120 may obtain live samples 308 from a source service 104 represented by a node in the data flow pipeline 114. The live samples 308 may be used to measure current flow rates of streaming data input sources, such as a number of records received for a predefined amount of time (e.g., records/sec), an amount of data received for a predefined amount of time (e.g., Kbytes/sec), and so forth. Thus, in this example real-time samples may be obtained as the data flow module 114 is being constructed by a user.

Characterization parameters 310 may also be obtained that describe algorithm action components 312 of nodes 314 of the data flow pipeline 114 as shown at the third stage 306. The algorithm action components 312 describe processing actions to be taken by a respective node in a pipeline 114, such as to count unique identifiers, perform filtering, and so on, and thus describe individual actions that are represented by the node 314. Consequently, characterization parameters 310 may describe functioning of the algorithm action components 312 when implemented, such as by an analytics service 106. This may include a specification of an amount of computational and/or network usage represented by the node 314 as well as processing characteristics (e.g., an amount of time to perform based on the usage) by the algorithm action components 312.

Therefore, the characterization parameters 310 may be used as a basis to describe an amount of processing performable by the node 314 over a period of time. Although collection of characterization parameters 310 from a live source is shown in the third stage 306, the characterization parameters 310 may also be stored locally and associated with the node 314, e.g., locally as part of the data flow design module 120.

Regardless of where originated, the live samples 308 and the characterization parameters 310 may then be used to validate operation of the data flow pipeline 114, further discussion of which may be found in the following description and shown in a corresponding figure.

FIG. 4 depicts a system 400 in an example implementation in which operation of nodes forming a data flow pipeline 114 is validated using live samples 308 and characterization parameters 310 of FIG. 3. This system 400 is illustrated using first and second stages 402, 404. At the first stage 402, the data flow design module 120 is utilized to produce a result 406 of a validation operation of the data flow pipeline 114 as it is being designed in real time as shown in FIG. 3. The result 406 is indicative of whether the data flow pipeline 114, as designed, will operate as intended. This validation may be performed in a variety of ways, such as by leveraging live samples 308 and/or characterization parameters 310.

For example, the data flow design module 118 may employ a flow rate module 408 to validate whether flow rates through the nodes of the data flow pipeline comply with predefined supported rates based at least in part on the online estimation automatically and without user intervention by the one or more computing devices (block 606 of FIG. 6). The flow rate module 408, for instance, may measure the acceptable output flow ranges of the streaming data flow outputs, based on an online estimation of the expected data results of the data flow pipeline 114. The estimation may be calculated using characterization parameters 310 of algorithm action components 312 along with live samples 308 of the input data sources. The estimation, for instance, may be computed and then compared with latency constraints to determine whether it complies with predefined supported rates.

To validate correctness of flow within the data flow pipeline 114, the flow rate module 408 may be configured to validate operation of the data flow based on a real time "snapshot" of current operating conditions. Further, this validation may be performed responsive to any changes made to the data flow pipeline 114 in real time. Therefore, the data flow user design module 120 may collect live samples 308 from input data sources to determine flow rate, e.g., how many records are coming in and how big the records are. This gives insight as to an overall throughput of the system what computing and network resources are going to be required to support this throughput.

For each of the outputs from the nodes that are currently included in the data flow pipeline, the characterization parameters 310 may be used to provide an estimate of flow rate supported by algorithm action components 312 of the node 314. Additionally, knowledge of joins (e.g., joining 502 together of branches of a data flow pipeline 114 as shown in the example 500 of FIG. 5) and diversions 504 that involve splitting of branches of the data flow pipeline as shown in the example of FIG. 5 may also be incorporated to determine flow rates.

A weighted graph algorithm may be employed by the data flow design module 120 to ensure that an overflow or underflow condition does not occur. For instance, the data flow originating from the input data source may provide a certain amount of pressure corresponding to the number and size of records contained within the flow. Accordingly, the computational and network capabilities as well as joins and diversions within the data flow pipeline 114 may define underflows and overflows, which may cause failure, and so on. Accordingly, the flow rate module 408 may be utilized to find an equilibrium in which the nodes of the data flow pipeline may operate as intended without over commitment of network or computational resources, which may be expensive.

An overflow condition, for instance, may cause a backup of I/O buffers associated with the nodes, which may cascade backwards through the data flow pipeline and ultimately reach the input data sources. This may cause a loss of a network connection to the input data sources as once the I/O buffers become full, the connection may be dropped. An overflow condition may also occur in the other direction which may backup to output nodes and cause too much data to be sent to those nodes based on the parameters of the flow.

For an underflow, suppose a node employs a rankings algorithm that only produces a valid result with a minimum amount of data over a minimum period of time, which would be one of the configurable settings for the actions. This action may involve receiving at least one thousand records per second in order to produce a viable result. Through use of the flow rate module 408, an examination may be performed of nodes that precede this node in the data flow pipeline to determine an input flow rate, the latency for the action calculation on the flow rates, and what it will produce.

The flow rate module 408 may then detect whether a least one thousand records per second are available at this node based on what proceeds it in the pipeline. It should be readily apparent that this number may be user configurable to specify what is considered "valid" for a processing result of the node, and thus also defines what the error condition is based on the underflow. In practice, an underflow typically results from a backup at a preceding node in the pipeline. So as part of that detection, the flow rate module 408 may progress backwards through the pipeline checking each node between there and the source to figure out if a cascading underflow exists all the way back to the source.

Other types of validation may also be performed by the data flow design module 120. An example of this is an acyclic feedback module 410 that is representative of functionality to examine nodes to ensure that feedback loops are not created within the pipeline that may also cause overflow and underflow. This is a related graph validation function to the discussion above but different because there is an option to take outputs of actions and feed it back into other parts of the pipeline. Therefore, the acyclic feedback module 410 may be employed to ensure that this feedback does not resonate or feed on itself and create underflow or overflow in any other way.

The result 406 of this validation may be utilized in a variety of ways. For example, the data flow user interface 118 may be utilized to display a result, such as "underflow condition detected" and may suggest corrections, such as modifications to the pipeline that may be made. As illustrated at the second stage 404, for instance, introduction of the step 412 node by a user may cause an underflow condition. Therefore, the data flow design module 120 may suggest another step 414 node to perform parallel actions using a diversion 416 and join 418.

In one or more implementations, responsive to the validation that the flow rates do not comply with the predefined supported rates, the data flow pipeline is adjusted by adding another node to or removing a node from the data flow pipeline automatically and without user intervention (block 608 of FIG. 6). Thus, in this example the suggestion described above may be performed automatically.

The results 406 may also be utilized to indicate operational metrics in the data flow user interface 118. This may include indications of flow rates at individual nodes, use of animations, color coding, and so on to indicate likely operation of the data flow pipeline 114. A user may then select an option to deploy 220 the data flow pipeline 114, which may then cause automatic provisioning of the pipeline, an example of which is described as follows and shown in corresponding figures referenced in the following section.

Data Flow Pipeline Activation and Provisioning

Figure 7:
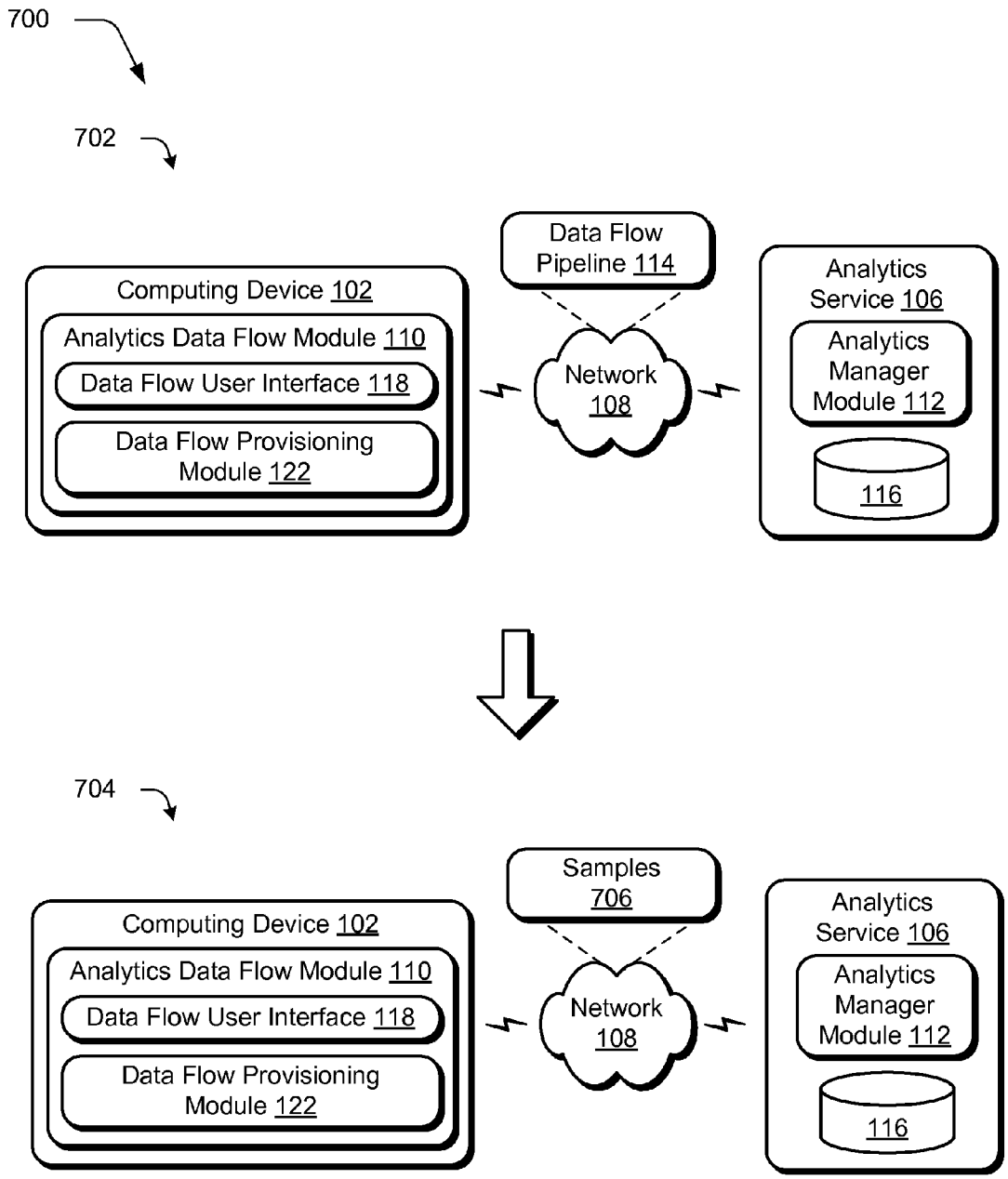
FIG. 7 depicts a system in an example implementation in which a data flow pipeline is provisioned for deployment by an analytics service.
Figure 8:
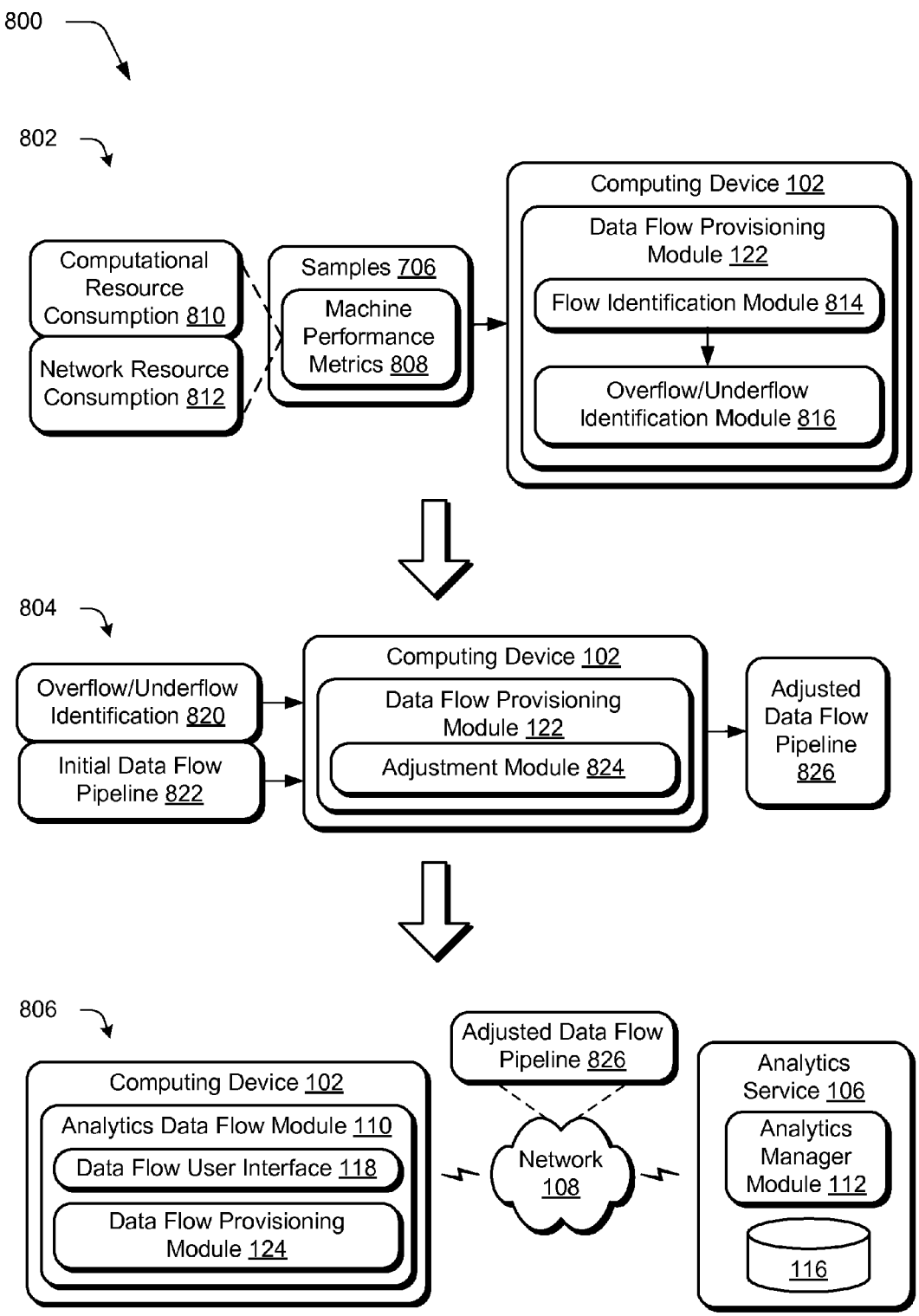
FIG. 8 depicts a system in an example implementation in which a flow rate efficiency calculation is performed based on the samples obtained as described in relation to FIG. 7.
Figure 9:
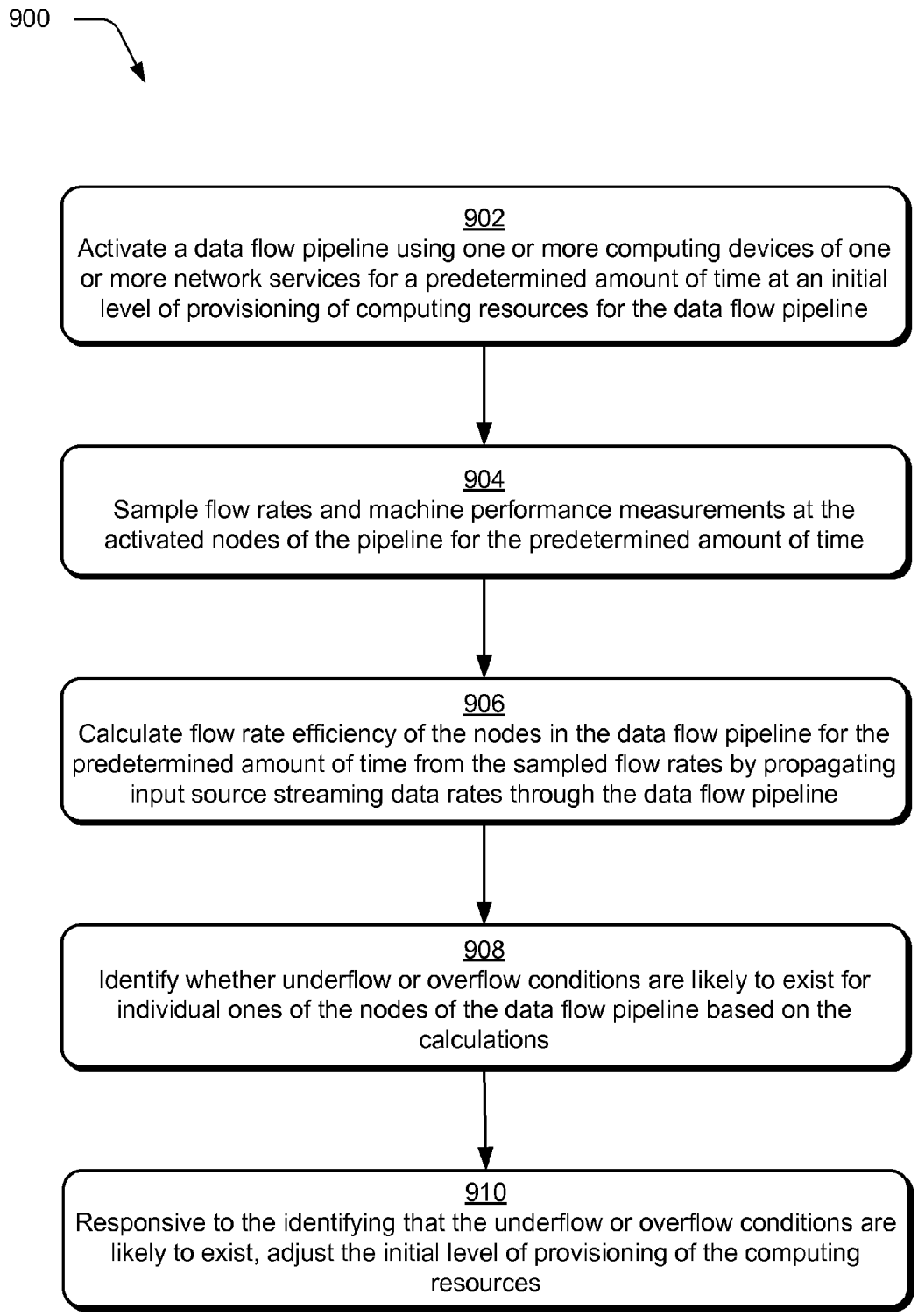
FIG. 9 is a flow diagram depicting a procedure in an example implementation in which a data flow pipeline is provisioned and adjusted.

FIGS. 7-9 describe example systems 700, 800 and a procedure 900, respectively, in which a data flow provisioning module 122 is used to aid design of a data flow pipeline. FIG. 9 is a flow diagram that describes steps in a procedure 900 in accordance with one or more embodiments. The procedure can be performed in connection with any suitable hardware, software, firmware, or combination thereof as further described in relation to FIG. 10. In at least some embodiments, the procedure is performed, at least in part, by suitably-configured modules, such as the data flow provisioning module 122 which may be implemented locally at the computing device 102 and/or remotely by the analytics service 106 as part of the analytics manager module 112. As such, the following discussion refers to FIGS. 7-9 and well as FIG. 1 in the description of this example functionality.

FIG. 7 depicts a system 700 in an example implementation in which a data flow pipeline 114 is provisioned for deployment by an analytics service 106. This system 700 is illustrated using first and second stages 702, 704. At the first stage 702, a data flow pipeline is activated using one or more computing devices of one or more network services for a predetermined amount of time at an initial level of provisioning of computing resources for the data flow pipeline (block 902 of FIG. 9). The computing device 102, for instance, may cause computing devices of the analytics service 106 to activate the data flow pipeline 114, such as a data flow pipeline 114 created as described in relation to FIGS. 2-6.

This activation may be performed with an initial level of provisioning of computing resources, such as a minimal number to implement the data flow pipeline as operational, which may include a reduction in parallelism, i.e., parallel branches of the pipeline executing matching tasks. Additionally, the activation may be performed for a predetermined amount of time, such as thirty seconds, such that the data flow pipeline is deactivated after the predetermined amount of time, e.g., during which calculations may be performed from samples taken as further described below.

Flow rates and machine performance measurements are sampled at the activated nodes of the pipeline for the predetermined amount of time (block 904 of FIG. 9), an example of which is shown at the second stage 704. Continuing with the previous example, samples 706 may be collected during the activation of the data flow pipeline 114 for a predetermined about of time. The samples 706 may describe a variety of machine performance measures, such as computational resource consumption, network resource consumption, and so on. For instance, the samples 706 may describe CPU load, memory usage, idle time, virtual memory swaps, input/output performance, input/output waiting, and so forth. These samples 706 may then service as a basis to perform a flow rate efficiency calculation, further discussion of which is described in the following and shown in corresponding figures.

FIG. 8 depicts a system 800 in an example implementation in which a flow rate efficiency calculation is performed based on the samples obtained as described in relation to FIG. 7. Flow rate efficiency of the nodes in the data flow pipeline is calculated for the predetermined amount of time from the sampled flow rates by propagating input source streaming data rates through the data flow pipeline (block 906 of FIG. 9). For example, input source streaming data rates may be propagated forward through a data flow pipeline, e.g., from source to sink, based on machine performance metrics 808, which may describe computational resource consumption 810 and network resource consumption 812 as previously described.

The data flow provisioning module 122 is illustrated as including a a flow identification module 814 and an overflow/underflow identification module 816. The flow identification module 814 is representative of functionality to propagate the streaming data rates through the nodes of the data flow pipeline 114 as a graph algorithm across the sampled data. This may include propagating streaming data rates forward through the nodes of the graph, with underflow or overflow conditions being propagated forward and/or backward through the nodes in the graph representing the pipeline.

An identification is made as to whether underflow or overflow conditions are likely to exist for individual ones of the nodes of the data flow pipeline based on the calculations (block 908 of FIG. 9). The overflow/underflow identification module 816, for instance, may then identify each overflow/underflow condition. This may include classification of these conditions as either a transmission overflow or a receiving node underflow using flow rate samples and machine performance samples for each pair of nodes connected directly to each other in the execution graph.

In practice, the machine performance samples may be incorporated into the classification decision using a binary flag for each sample indicating the absence or presence of a value threshold exception, which indicates compliance (or lack thereof) with a range of an error function defined for the nodes. The value threshold for each sample type may be determined experimentally by observation and these values are not automatically adjusted in one or more implementations. The classification estimates the probability that the condition is either a transmission overflow or a receiving node underflow using the available data.

At the second stage 804, responsive to the identification that the underflow or overflow conditions are likely to exist, the initial level of provisioning of the computing resources is adjusted (block 910 of FIG. 9). Continuing with the previous example, the data flow provisioning module 122 may receive an overflow/underflow identification 820 as calculated in the first stage 802 along with a description of the initial data flow pipeline 822 that was activated. The data flow provisioning module 122 may then employ an adjustment module 824 to make adjustments to the provisioning of nodes with the initial data flow pipeline 822 to generate an adjust data flow pipeline 826. The adjustment, for instance, may cause an increase in resources for nodes that have been classified as causing an overflow and reduced for resources of nodes that have been classified as causing an overflow.

At the third stage 806, the adjusted data flow pipeline 826 is activated for provisioning and implementation by the analytics service 106 as previously described in relation to stage 702 of FIG. 7. In one or more implementations, iterative techniques may be employed such that the data flow pipeline is iteratively provisioned until convergence within the threshold of the error function is reached. Thus, these techniques may operate to adjust provisioning as a binary search of a provisioning parameter space utilizing the flow rate efficiency calculation and the overflow/underflow condition identification as parameters of the error function to be minimized. The process may be limited to a set number of iterations (e.g., ten), and may permit early termination if the rate of change of the error function is less than five percent for two successive iterations, i.e., within convergence within the threshold of the error function. A variety of other examples are also contemplated as previously described.

Example System and Device

Figure 10:
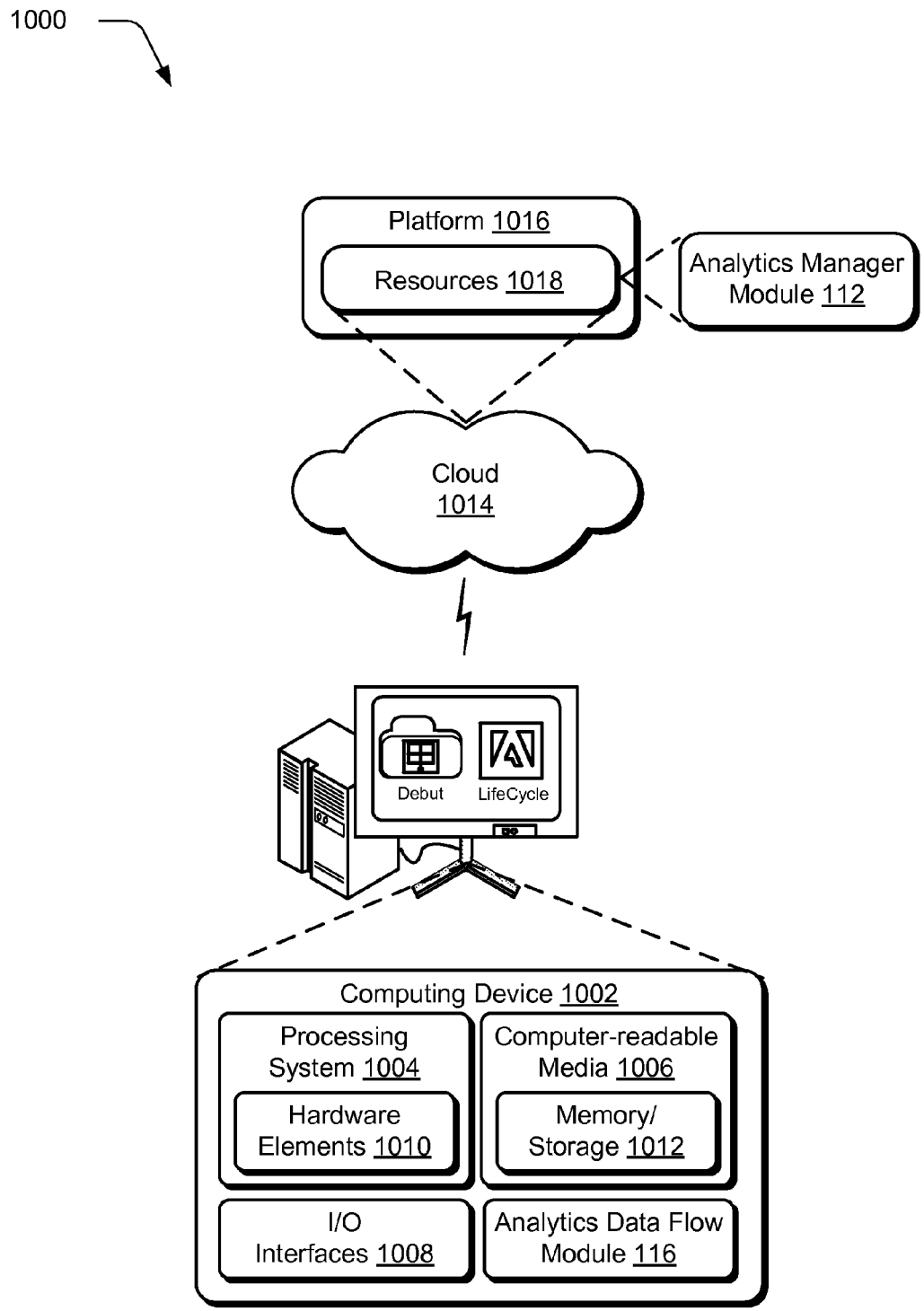
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the analytics data flow module 116 and the analytics manager module 112. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving a selection, generated via user interaction with a graphical user interface of at least one computing device, indicating an addition to or removal of a node to or from a data flow pipeline as then having a plurality of nodes as a result of the selection, the plurality of nodes of the pipeline configured to process, originate, or receive streaming data that flows from at least one input data source accessible via a network, the data flow pipeline representing an execution graph of algorithm actions performed by the plurality of nodes as implemented by a processing system and non-transitory computer-readable storage media;
   obtaining, by the at least one computing device, live samples in real time from the plurality of nodes responsive to the receipt of the selection indicating the addition to or removal of the node to or from the data flow pipeline;
   generating, by the at least one computing device, a real-time online estimation of expected data flow rates through the plurality of nodes of the data flow pipeline by processing the obtained live samples;
   validating, automatically and without user intervention by the at least one computing device in real time, whether the expected data flow rates through the plurality of nodes of the data flow pipeline comply with predefined supported data flow rates based at least in part on the online estimation;
   outputting, by the at least one computing device in response to the validating, a visual indication indicative of the data flow rates through the plurality of nodes of the data flow pipeline in real-time corresponding to the node addition to or node removal from the data flow pipeline; and
   adjusting, by the at least one computing device automatically and without user intervention in real time responsive to the validating, the data flow pipeline by adding another node to or removing at least one of the plurality of nodes from the data flow pipeline.

2. The method as described in claim 1, wherein the obtaining, the generating, the validating, the outputting, and the adjusting are repeated for a plurality of iterations.

3. The method as described in claim 1, wherein the node is configured to process the streaming data and thus is representative of algorithm actions to be performed by the node to perform data processing as well as an amount of computing or network resources allocated to perform the algorithm actions of the node.

4. The method as described in claim 1, wherein the validating includes validating that data flow rates through the plurality of nodes of the data flow pipeline do not result in overflow or underflow conditions at individual ones of the plurality of nodes.

5. The method as described in claim 4, wherein the validating is performed using latency constraints.

6. The method as described in claim 4, wherein at least one of the plurality of nodes is configured as a join point or a diversion point in the data flow pipeline.

7. The method as described in claim 1, wherein the validating includes validating the data flow pipeline does not produce runaway acyclic feedback.

8. The method as described in claim 1, wherein the validating is performed by calculating characterization parameters of algorithm action components of the node.

9. The method as described in claim 1, wherein the live samples are measured based on a number of records received for a predefined amount of time or an amount of data received for a predefined amount of time.

10. A system comprising:
   at least one processor; and
   at least one computer-readable storage memory device containing at least one module that, responsive to execution by the at least one processor, causes the at least one module to perform operations comprising:
   receiving a selection, generated via user interaction with a graphical user interface, indicating an addition to or removal of a node to or from a data flow pipeline being designed as then having a plurality of nodes as a result of the selection, the plurality of nodes of the pipeline configured to process, originate, or receive streaming data from at least one input data source accessible via a network, the plurality of nodes of the data flow pipeline representing an execution graph of algorithm actions implemented by a processing system and non-transitory computer-readable storage media of at least one computing device;
   sampling machine performance metrics in real time from the plurality of nodes responsive to the receipt of the selection indicating the addition to or removal of the node to or from the data flow pipeline;
   generating a real-time online estimation of expected data flow rates through the plurality of nodes by processing the sampled machine performance metrics;
   validating whether the expected data flow rates through the plurality of nodes of the data flow pipeline comply with predefined supported data flow rates based at least in part on the online estimation, the validating performed automatically and without user intervention in real-time; and
   outputting a visual indication indicative of the validated data flow rates in real-time in the graphical user interface.

11. The system as described in claim 10, wherein the operations further comprise, responsive to the validating that the data flow rates do not comply with the predefined supported data flow rates, adjusting the data flow pipeline by adding another node to or removing at least one of the plurality of nodes from the data flow pipeline.

12. The system as described in claim 11, wherein the operations further comprise repeating the obtaining, the generating, and the validating responsive to the adjusting.

13. The system as described in claim 11, wherein the node is configured to process the data and thus is representative of algorithm actions to be performed by the node to perform data processing as well as an amount of computing resources allocated to perform the algorithm actions of the node.

14. The system as described in claim 10, wherein the validating includes validating that data flow rates through the plurality of nodes of the data flow pipeline do not result in overflow or underflow conditions at individual ones of the plurality of nodes.

15. The system as described in claim 14, wherein the validating is performed using latency constraints.

16. The system as described in claim 10, wherein the validating operations include validating that the data flow pipeline does not produce runaway acyclic feedback.

17. The system as described in claim 10, wherein the operations further comprise performing the validating by calculating characterization parameters of algorithm action components of the plurality of nodes.

18. A system for validating streaming data flow rates, the system comprising:
   a data flow pipeline implemented as an execution graph of algorithm actions performed to process streaming data flows from at least one input data source, the data flow pipeline implemented by a processing system and non-transitory computer-readable storage media of at least one computing device;
   a data flow design module implemented by the processing system and non-transitory computer-readable storage media of the at least one computing device to receive a selection via a data flow user interface indicating an addition to or removal of a node to or from the data flow pipeline as then having a plurality of nodes as a result of the selection,
   a flow rate module implemented by the processing system and non-transitory computer-readable storage media of the at least one computing device to:
      obtain live samples of machine performance metrics in real time from the plurality of nodes;
      determine expected data flow rates through the data flow pipeline using the obtained live samples;
      validate, automatically and without user intervention in real time, whether the expected data flow rates comply with predefined supported data flow rates for the plurality of nodes of the data flow pipeline; and
      output, via the data flow user interface in real time, a visual indication indicative of a result of the validation.

19. The system as described in claim 18, wherein the visual indication indicates whether the addition to or removal of the node from the data flow pipeline results in overflow or underflow conditions at individual ones of the plurality of nodes.

* * * * *